Jan. 15, 1952     R. W. BROWN     2,582,377
RECOVERY OF GALLIUM FROM ALKALI METAL ALUMINATE SOLUTIONS
Filed April 11, 1947
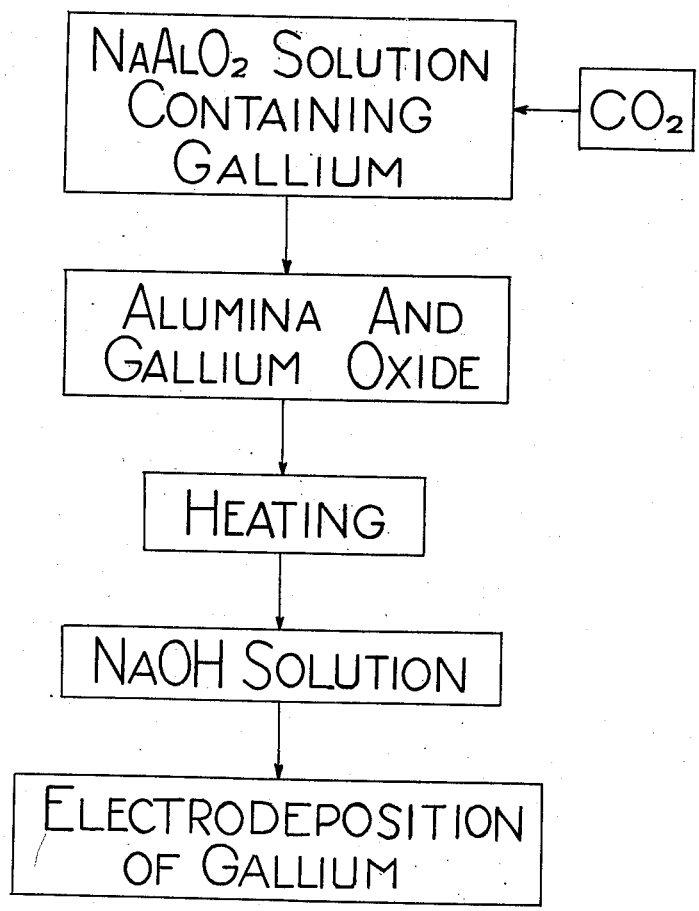
INVENTOR.
Ralph W. Brown.
BY
Edward B. Foote
ATTORNEY:-

Patented Jan. 15, 1952

2,582,377

UNITED STATES PATENT OFFICE 2,582,377

RECOVERY OF GALLIUM FROM ALKALI METAL ALUMINATE SOLUTIONS

Ralph Waldo Brown, East St. Louis, Ill., assignor to Aluminum Company of America, Pittsburgh, Pa., a corporation of Pennsylvania Application April 11, 1947, Serial No. 740,981

6 Claims. (Cl. 204—105)

1

This invention relates to the production of gallium oxide, and relates particularly to recovering gallium oxide from alkali metal aluminate solutions having dissolved gallium therein.

Gallium oxide can be extracted from various minerals by dissolving the gallium oxide in an aqueous alkali metal hydroxide solution, such as a 10–20 per cent solution of sodium or potassium hydroxide. However, minerals containing gallium oxide frequently also contain a large proportion of alumina which also dissolves in such solutions to form alkali metal aluminate. Since the percentage of gallium oxide in the ore is very small (reported analyses range from less than 0.001 per cent to 0.01 per cent), the solutions produced when dissolving gallium oxide from such ores by means of an alkali metal hydroxide solution contain a very large proportion of alkali metal aluminate and only a small proportion of dissolved gallium.

It has been stated in the literature ("Das Gallium," by Einecke, page 92, published in 1944 by J. W. Edwards) that gallium oxide and hydroxide, dissolved in alkali metal hydroxide solutions, form alkali metal gallates which are analogous to the corresponding aluminates. Since there is, however, some uncertainty about their constitution, I have preferred to designate such an alkaline solution merely as one containing dissolved gallium, thus making no assumptions as to the actual chemical compound of gallium present in the solution.

When gallium oxide is precipitated from solutions of the type mentioned above by adding an acid or acid salt to the solution, alumina also precipitates, and since the amount of alkali metal aluminate in the solution is so much larger than the amount of dissolved gallium present, the proportion of alumina to gallium oxide in the precipitate is quite large. Consequently, if it is attempted to recover metallic gallium by dissolving the precipitate in a suitable solvent and then precipitating gallium from the resulting solution by previously proposed methods, the gallium concentration of that solution is too small for economical extraction of gallium.

A method of avoiding that difficulty is described in the co-pending United States patent application S. N. 739,538 of Francis C. Frary, filed April 5, 1947, and entitled "Process of Producing Metal," by converting alkali metal aluminate in the original gallium-bearing solution to alkali metal hydroxide and precipitated calcium aluminate, while leaving the gallium in solution. Thereafter gallium oxide is precipitated from the solution by introducing an acidic material thereinto, and the precipitated gallium oxide is subsequently dissolved in a solvent to form a solution from which metallic gallium is recovered.

I have found that precipitation of gallium oxide by the addition of an acidic material to an alkali metal hydroxide solution containing dissolved gallium is facilitated if alumina is co-precipitated with the gallium oxide as a result of the presence in the solution of sufficient alkali metal aluminate to provide an atomic ratio of dissolved aluminum to dissolved gallium of at least 25:1. With lower atomic ratios of aluminum to gallium, precipitation of gallium oxide from the solution is much more difficult, and becomes increasingly difficult as the atomic ratio becomes smaller. On the other hand, it is preferred that the atomic ratio of aluminum to gallium in the solution be no greater than 100:1 in order that the proportion of alumina to gallium oxide in the precipitate produced shall be sufficiently low to minimize the cost of extraction of gallium by dissolving the precipitate and subsequently precipitating metallic gallium from the solution thus produced. By precipitating gallium oxide from a solution in which the ratio of dissolved aluminum to gallium lies within the above range, it is feasible to produce precipitates without difficulty which contain gallium oxide equal to 2 per cent of the weight of the alumina values in the precipitate.

Accordingly in carrying out my invention, after an alkali metal aluminate solution with gallium dissolved therein has been produced in which the atomic ratio of dissolved aluminum to gallium is greater than 100:1, part of the aluminum is insolubilized by converting alkali metal aluminate to alkali metal hydroxide and a precipitated aluminum compound to produce a solution in which the atomic ratio of dissolved aluminum to dissolved gallium is at least 25:1, but preferably is not greater than 100:1. Such insolubilization of aluminum can be effected satisfactorily in accordance with the procedure described in the above-mentioned application of Francis C. Frary of mixing sufficient hydrated lime or quick lime with the original solution—which preferably is maintained at a temperature of above 100° F.— to react with the necessary proportion of the alkali metal aluminate in the solution and form calcium aluminate and alkali metal hydroxide, and leave a solution having a ratio of dissolved aluminum to dissolved gallium within the above-mentioned range. If the original solution contains ingredients other than alkali metal aluminate which react with the calcium compound added, it is, of course, necessary to use sufficient lime for such side reactions, as well as for the formation of the desired amount of calcium aluminate. Also, part of the dissolved aluminum may be precipitated as aluminum hydroxide by other known processes, if desired, before adding the calcium compound.

After the above-mentioned precipitation of aluminum values from the solution, hydrous gallium oxide and alumina are co-precipitated from the solution by introducing an acid or acid salt into it. The precipitate thus produced is then dissolved in a suitable solvent, and metallic gallium is extracted from the resultant solution by known processes, such as by electro-deposition. The solvent may be either acid or alkaline, depending on the conditions under which it is desired to precipitate the gallium. An aqueous solution of sodium hydroxide is an example of a satisfactory solvent if the gallium is to be precipitated by electrodeposition.

If the metallic gallium is to be recovered by electrodeposition, it is desirable that, when the co-precipitated alumina and gallium oxide are dissolved to form the electrolyte from which gallium is to be produced, it be free of organic matter resulting from the presence of humus in the mineral which serves as the source of the gallium oxide. Humus dissolves in the alkali metal hydroxide solution along with alumina and gallium oxide of the ore, and consequently when alumina and gallium oxide are co-precipitated from the resultant solution as described above, the precipitate is contaminated with organic compounds which will dissolve in the electrolyte. The presence of the dissolved organic material in the electrolyte inhibits electrodeposition of gallium. Consequently, prior to dissolving the precipitate containing such organic material to form the electrolyte, it is desirable to heat the precipitate to destroy the organic material. A temperature of 350° C. or over is satisfactory for this purpose. After such heating of the precipitate, gallium can be electrodeposited much more readily from the electrolyte containing the dissolved precipitate.

In the step mentioned above of co-precipitating the alumina and gallium oxide, carbon dioxide (which may be in the form of gas, carbonic acid, or sodium bicarbonate) is the acidic material preferred as the precipitant. The precipitate produced by such use of carbon dioxide contains a substantial proportion of combined alkali metal and carbon dioxide, apparently in the form of an alkali metal aluminum carbonate. Although the precipitate obtained can be dissolved in acid or alkaline solutions to produce the solution from which metallic gallium is to be precipitated, I have found that the precipitate can be dissolved much more readily if it has first been heated at a temperature of at least 300° C. to drive off carbon dioxide. By that procedure alkali metal aluminate is apparently formed which dissolves readily in aqueous solutions and thus permits the solvent to reach the gallium oxide quickly. Organic material that may be present, as described in the preceding paragraph, can also be destroyed in the course of such heating.

The duration of the heating operation depends on such factors as the proportion of combined carbon dioxide which is to be driven off, the temperature employed, the physical state of the material heated, and cost considerations. In general the higher the temperature at which the precipitate is heated, the shorter the period required for removing a given amount of carbon dioxide. Ordinarily a temperature of 350–600° C., and a heating period from one-half hour to four hours are preferred.

The improvement effected by heating the precipitate as described above is illustrated by the following example: A precipitate composed of alumina, soda ($Na_2O$), carbon dioxide, gallium oxide values, and water, plus minor impurities, was obtained by passing a stream of gaseous carbon dioxide into a sodium aluminate solution with gallium dissolved therein. When a portion of that precipitate was added to a boiling aqueous sodium hydroxide solution containing 50 per cent of the amount of sodium hydroxide theoretically required to form sodium aluminate and sodium gallate with all of the aluminum and gallium values present, 71 per cent by weight of the precipitate dissolved in one hour. However, when an equal amount of the precipitate was heated at 450° C. for one-half hour, 93 per cent of the solid residue dissolved in one hour when added to a boiling sodium hydroxide solution of the same concentration and volume as the solution used with the previously mentioned portion.

The accompanying drawing is a flow diagram of the production of gallium in accordance with procedures described above. In the process illustrated, alumina and gallium oxide are co-precipitated from a sodium aluminate solution containing dissolved gallium by feeding carbon dioxide into the solution. The resultant precipitate is heated at a temperature at least 300° C., after which it is dissolved in an aqueous sodium hydroxide solution. Thereafter metallic gallium is electrodeposited from the solution thus produced.

I claim:

1. The process of preparing from an alkali metal aluminate solution containing dissolved gallium, a solution for the production of metallic gallium, comprising insolubilizing sufficient of the aluminum values of the solution that the atomic ratio of dissolved aluminum to dissolved gallium of the resultant solution is at least 25:1, subsequently co-precipitating alumina and gallium oxide from the latter solution by introducing carbon dioxide into that solution, heating the said precipitate at a temperature of at least 300° C., and thereafter dissolving the precipitate in an aqueous solvent therefor.

2. In the process of producing a solution containing dissolved gallium, comprising the steps of co-precipitating alumina and gallium oxide from a solution containing alkali metal aluminate and gallium dissolved therein by introducing carbon dioxide into that solution, and dissolving the said precipitate in an aqueous solvent therefor, the step of heating the said precipitate at a temperature of at least 300° C. prior to the said dissolving thereof.

3. In the process of producing gallium from materials containing alumina, gallium oxide, and humus, comprising the steps of dissolving alumina, gallium oxide, and humus from such material in an alkali metal hydroxide solution, co-precipitating alumina and gallium oxide from the resultant solution by introducing thereinto an acidic material, dissolving the said precipitate in an aqueous solvent therefor, and electrodepositing metallic gallium from the latter solution, the step comprising heating the said precipitate at a temperature of at least 350° C. prior to the said dissolving thereof.

4. A process according to claim 2, in which the aqueous solvent in which the co-precipitated alumina and gallium oxide are dissolved in a sodium hydroxide solution.

5. The process of producing metallic gallium comprising the steps of co-precipitating alumina and gallium oxide from an alkali metal aluminate solution containing dissolved gallium by introducing carbon dioxide into the said solution, heating the resultant precipitate to a temperature of at least 300° C., thereafter dissolving the precipitate in an aqueous solvent therefor, and recovering metallic gallium from the solution thus produced.

6. The process of producing metallic gallium comprising the steps of co-precipitating alumina and gallium oxide from an alkali metal aluminate solution containing dissolved gallium by introducing carbon dioxide into the said solution, heating the resultant precipitate to a temperature of at least 300° C., thereafter dissolving the precipitate in a sodium hydroxide solution, and electrodepositing metallic gallium from the solution thus produced.

RALPH WALDO BROWN.

REFERENCES CITED

The following references are of record in the file of this patent:

UNITED STATES PATENTS

| Number | Name | Date |
|---|---|---|
| 382,505 | Bayer | May 8, 1888 |
| 461,416 | Bradburn et al. | Oct. 20, 1891 |
| 515,895 | Bayer | Mar. 6, 1894 |
| 663,167 | Hall | Dec. 4, 1900 |
| 938,432 | Peffer | Oct. 26, 1909 |
| 941,799 | McCullough | Nov. 30, 1909 |
| 1,013,022 | Kendall | Dec. 26, 1911 |
| 1,855,455 | McCutcheon | Apr. 26, 1932 |

FOREIGN PATENTS

| Number | Country | Date |
|---|---|---|
| 381,520 | Great Britain | Oct. 6, 1932 |
| 423,594 | Great Britain | Jan. 31, 1935 |

OTHER REFERENCES

A Textbook of Inorganic Chemistry edited by Friend, vol. 4, Aluminum and its Cogeners, by Little, page 145 (1917).

U. S. Bureau of Mines Circular 6401, page 4, "Gallium, Vanadium, Indium, and Scandium," by Alice V. Petar, November 1930.

Caven and Lander: "Systematic Inorganic Chemistry," pp. 158–160 (1932).